United States Patent
Ahn et al.

(10) Patent No.: US 8,634,369 B2
(45) Date of Patent: Jan. 21, 2014

(54) METHOD AND APPARATUS FOR CONTROLLING TRANSMIT POWER IN WIRELESS COMMUNICATION SYSTEM

(75) Inventors: Joon Kui Ahn, Anyang-si (KR); Min Gyu Kim, Anyang-si (KR); Dae Won Lee, Anyang-si (KR); Suck Chel Yang, Anyang-si (KR); Bong Hoe Kim, Anyang-si (KR); Dong Youn Seo, Anyang-si (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 13/394,669

(22) PCT Filed: Sep. 8, 2010

(86) PCT No.: PCT/KR2010/006096
§ 371 (c)(1),
(2), (4) Date: Mar. 7, 2012

(87) PCT Pub. No.: WO2011/031059
PCT Pub. Date: Mar. 17, 2011

(65) Prior Publication Data
US 2012/0170533 A1    Jul. 5, 2012

Related U.S. Application Data

(60) Provisional application No. 61/240,652, filed on Sep. 8, 2009.

(30) Foreign Application Priority Data

Sep. 7, 2010    (KR) .................. 10-2010-0087344

(51) Int. Cl.
*H04W 4/00*    (2009.01)

(52) U.S. Cl.
USPC .................. 370/329; 370/437; 455/452.1

(58) Field of Classification Search
USPC .......... 370/328–330, 340–341, 343–344, 437, 370/465, 480; 455/450, 451, 452.1, 455, 455/515–517, 522
See application file for complete search history.

(56) References Cited

U.S. PATENT DOCUMENTS

| | | |
|---|---|---|
| 8,462,705 B2 * | 6/2013 | Kim et al. .................... 370/328 |
| 2004/0132496 A1 | 7/2004 | Kim et al. |

(Continued)

FOREIGN PATENT DOCUMENTS

| | | |
|---|---|---|
| KP | 10-2008-0063629 A | 7/2008 |
| KR | 10-2007-0072983 A | 7/2007 |
| WO | WO 2005/048640 A1 | 5/2005 |
| WO | WO 2008/146515 A1 | 12/2008 |

OTHER PUBLICATIONS

3GPP, "Technical Specification Group Radio Access Network; Evolved Universal Terrestrial Radio Access (E-UTRA); Physical layer procedures (Release 8)," 3GPP TS 36.213 V8.7.0, Jun. 2009, pp. 1-77.

(Continued)

*Primary Examiner* — Kevin Mew
(74) *Attorney, Agent, or Firm* — Birch, Stewart, Kolasch & Birch, LLP

(57) ABSTRACT

A method and apparatus of controlling transmit power in a wireless communication system is provided. A wireless apparatus selects one transmit mode among a plurality of transmit modes, and determines the transmit power on the basis of the selected transmit mode. The wireless apparatus transmits an uplink channel by using the transmit power.

12 Claims, 10 Drawing Sheets

(56) References Cited

U.S. PATENT DOCUMENTS

| | | | |
|---|---|---|---|
| 2010/0135424 A1 | 6/2010 | Usui et al. | |
| 2012/0113831 A1* | 5/2012 | Pelletier et al. | 370/252 |
| 2012/0224535 A1* | 9/2012 | Kim et al. | 370/328 |
| 2012/0327866 A1* | 12/2012 | Krishnamurthy et al. | 370/329 |
| 2013/0039195 A1* | 2/2013 | Weng et al. | 370/252 |
| 2013/0051259 A1* | 2/2013 | Kim et al. | 370/252 |
| 2013/0077569 A1* | 3/2013 | Nam et al. | 370/328 |
| 2013/0083729 A1* | 4/2013 | Xu et al. | 370/328 |
| 2013/0121279 A1* | 5/2013 | Noh et al. | 370/329 |
| 2013/0163537 A1* | 6/2013 | Anderson et al. | 370/329 |

OTHER PUBLICATIONS

LG Electronics, "Uplink transmission under UE transmit power limitation in LTE-Advanced," 3GPP TSG RAN WG1 #58, R1-093250, Shenzhen, China, Aug. 24-28, 2009, pp. 1-3.

Huawei, 3GPP TSG RAN WG1#57, R1-091816, "Performances of UL multiple antenna transmission for PUCCH," San Francisco, USA, May 4-8, 2009, pp. 2-8.

Samsung, 3GPP TSG RAN WG1 #58, R1-093395, "UL Transmission Power Control in LTE-A," Shenzhen, China, Aug. 24-28, 2009, pp. 1-5.

* cited by examiner

Fig. 6
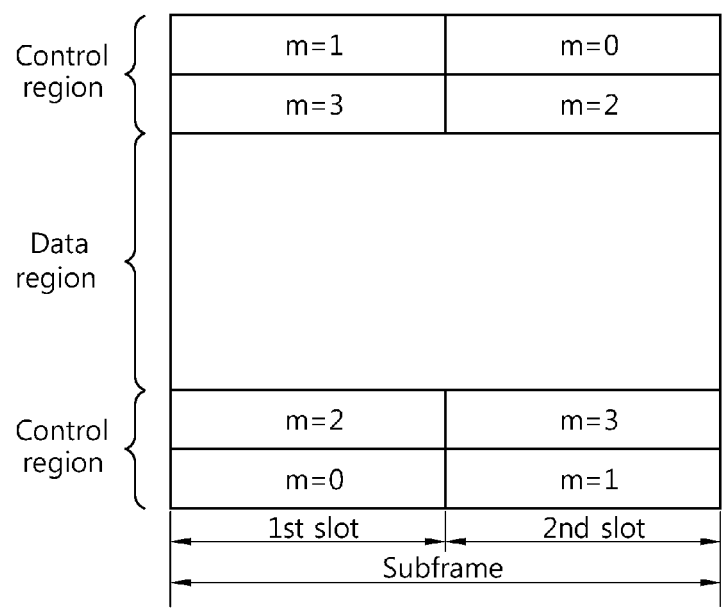
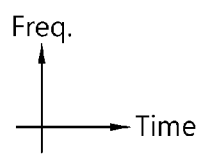

METHOD AND APPARATUS FOR CONTROLLING TRANSMIT POWER IN WIRELESS COMMUNICATION SYSTEM

CROSS REFERENCE TO RELATED APPLICATIONS

This application is the National Phase of PCT/KR2010/006096 filed on Sep. 8, 2010, which claims priority under 35 U.S.C. 119(e) to U.S. Provisional Application No. 61/240,652 filed on Sep. 8, 2009 and under 35 U.S.C. 119(a) to Patent Application No. 10-2010-0087344 filed in Republic of Korea on Sep. 7, 2010, all of which are hereby expressly incorporated by reference into the present application.

TECHNICAL FIELD

The present invention relates to wireless communication, and more particularly, to a method and apparatus for controlling transmit power in a wireless communication system.

BACKGROUND ART

Long term evolution (LTE) based on 3rd generation partnership project (3GPP) technical specification (TS) release 8 is a promising next-generation mobile communication standard.

As disclosed in 3GPP TS 36.211 V8.5.0 (2008-12) "Evolved Universal Terrestrial Radio Access (E-UTRA); Physical Channels and Modulation (Release 8)", a physical channel of the LTE can be classified into a data channel, i.e., a physical downlink shared channel (PDSCH) and a physical uplink shared channel (PUSCH), and a control channel, i.e., a physical downlink control channel (PDCCH), a physical control format indicator channel (PCFICH), a physical hybrid-ARQ indicator channel (PHICH), and a physical uplink control channel (PUCCH).

A PDCCH (i.e., a downlink control channel) carries a downlink grant for receiving the PDSCH of a UE (UE) and an uplink grant for transmitting the PUSCH of a UE. A PUCCH (i.e., an uplink control channel) carries an uplink control signal (e.g., ACK (positive-acknowledgement)/NACK (negative-acknowledgement) signals for a HARQ), a CQI (Channel Quality Indicator) indicating the condition of a downlink channel, an SR (Scheduling Request) for requesting the allocation of radio resources for uplink transmission, and so on.

To guarantee a higher data rate, a technique using a multi-antenna has been introduced.

Through transmit diversity and spatial multiplexing, multiple antenna transmission can achieve higher link performance compared to single antenna transmission.

The conventional 3GP LTE does not support multiple antenna transmission in uplink. However, as a next generation communication system employs the multiple antenna uplink, uplink transmit power is needed to consider multiple antenna transmission.

DISCLOSURE OF INVENTION

Technical Problem

The present invention provides a method and apparatus for performing an HARQ using a plurality of resources and a plurality of antennas.

Solution to Problem

In an aspect, a method of controlling a transmit power in a wireless communication system is provided. The method includes selecting one transmit mode among a plurality of transmit modes, determining the transmit power on the basis of the selected transmit mode, and transmitting an uplink channel by using the transmit power.

The plurality of transmit modes may include a multiple-antenna transmit mode and a single-antenna transmit mode.

The plurality of transmit modes may be determined based on the number of transmit antennas.

The uplink channel may be a physical uplink shared channel (PUSCH) or a physical uplink control channel (PUCCH).

The step of determining of the transmit power on the basis of the selected transmit mode may include adding a transmit power control value corresponding to the selected transmit mode to transmit power for the uplink channel.

One of transmit mode may be selected among the plurality of transmit modes on the basis of a resource allocated to the uplink channel.

If the number of resources allocated to the uplink channel is greater than 1, a multiple-antenna transmission mode may be selected, and if the number of resources allocated to the uplink channel is 1, a single-antenna transmission mode may be selected.

A resource allocated to the uplink channel may be obtained based on a resource used to transmit a downlink control channel.

In another aspect, a wireless apparatus includes a plurality of antennas, a transceiver configured for transmitting an uplink channel through the plurality of antennas by using transmit power, and a transmit power controller configured for selecting one transmit mode among a plurality of transmit modes and determining the transmit power on the basis of the selected transmit mode.

Advantageous Effects of Invention

As a user equipment switches a transmit mode, a transmit power can be adjusted. Therefore, link performance can be improved.

BRIEF DESCRIPTION OF DRAWINGS

FIG. 6 is a diagram showing an example of an uplink subframe in the 3GPP LTE.

MODE FOR THE INVENTION

Figure 1:
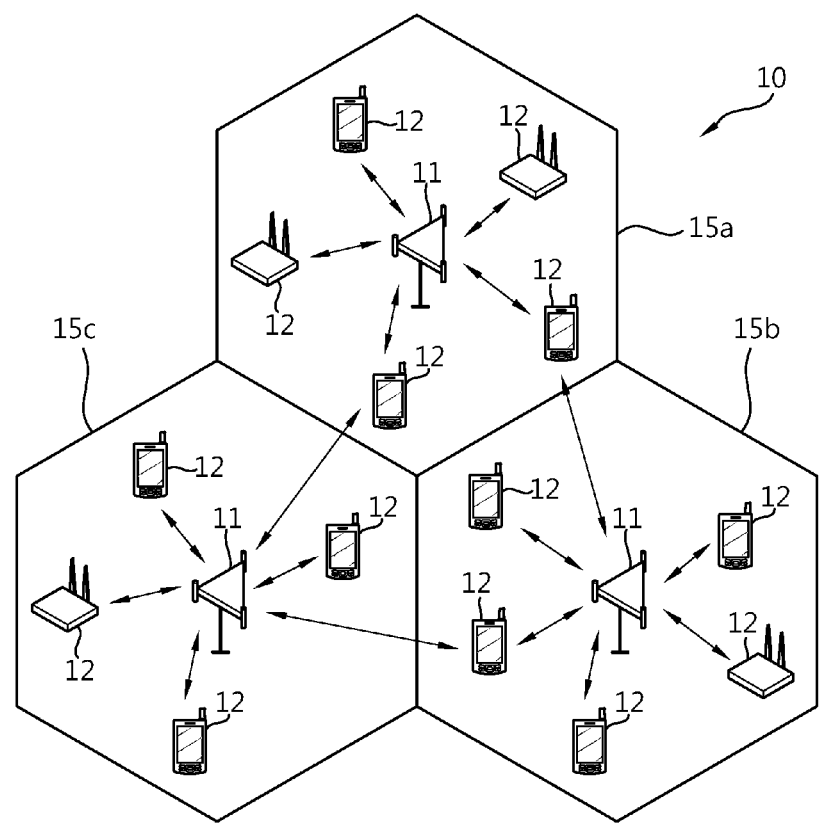
FIG. 1 is a diagram showing a wireless communication system.

FIG. 1 is a diagram showing a wireless communication system. A wireless communication system 10 includes one or more base stations (BSs) 11. Each of the BSs 11 provides communication services to a specific geographical area (in general referred to as a cell) 15a, 15b, or 15c. Each of the cells can be divided into a plurality of regions (referred to as sectors).

A user equipment (UE) 12 may be fixed or mobile, and may be referred to as another terminology, such as a mobile station (MS), a mobile terminal (MT), a user terminal (UT), a subscriber station (SS), a wireless device, a personal digital assistant (PDA), a wireless modem, a handheld device, etc.

The BS 11 is generally a fixed station that communicates with the UE 12 and may be referred to as another terminology, such as an evolved node-B (eNB), a base transceiver system (BTS), an access point, etc.

Hereinafter, downlink implies communication from the BS to the UE, and uplink implies communication from the UE to the BS. In the downlink, a transmitter may be a part of the BS, and a receiver may be a part of the MS. In the uplink, the transmitter may be a part of the UE, and the receiver may be a part of the BS.

Figure 2:
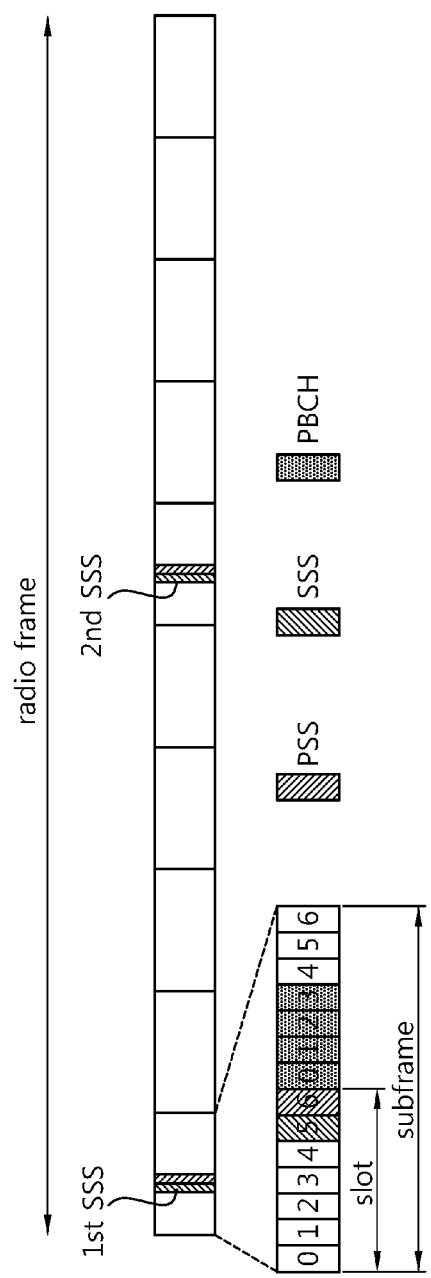
FIG. 2 is a diagram showing the structure of a radio frame in the 3GPP LTE.

FIG. 2 is a diagram showing the structure of a radio frame in the 3GPP LTE. The section 6 of 3GPP TS 36.211 V8.5.0 (2008-12) "Evolved Universal Terrestrial Radio Access (E-UTRA); Physical Channels and Modulation (Release 8)" may be incorporated herein by reference. A radio frame consists of 10 subframes indexed with 0 to 9. One subframe consists of 2 slots. A time required for transmitting one subframe is defined as a transmission time interval (TTI). For example, one subframe may have a length of 1 millisecond (ms), and one slot may have a length of 0.5 ms.

One slot may include a plurality of orthogonal frequency division multiplexing (OFDM) symbols in a time domain. Since the 3GPP LTE uses orthogonal frequency division multiple access (OFDMA) in a downlink, the OFDM symbol is only for expressing one symbol period in the time domain, and there is no limitation in a multiple access scheme or terminologies. For example, the OFDM symbol may also be referred to as another terminology such as a single carrier frequency division multiple access (SC-FDMA) symbol, a symbol period, etc.

Although it is described that one slot includes 7 OFDM symbols for example, the number of OFDM symbols included in one slot may vary depending on a length of a cyclic prefix (CP). According to 3GPP TS 36.211 V8.5.0 (2008-12), in case of a normal CP, one subframe includes 7 OFDM symbols, and in case of an extended CP, one subframe includes 6 OFDM symbols.

A resource block (RB) is a resource allocation unit, and includes a plurality of subcarriers in one slot. For example, if one slot includes 7 OFDM symbols in a time domain and an RB includes 12 subcarriers in a frequency domain, one RB can include 7×12 resource elements (REs).

A primary synchronization signal (PSS) is transmitted in last OFDM symbols of a 1st slot, i.e., a 1st slot of a 1st subframe (a subframe indexed with 0), and an 11th slot, i.e., a 1st slot of a 6th subframe (a subframe indexed with 5). The PSS is used to obtain OFDM symbol synchronization or slot synchronization, and is in association with a physical cell identify (ID). A primary synchronization code (PSC) is a sequence used for the PSS. There are three PSCs in the 3GPP LTE. One of the three PSCs is transmitted using the PSS according to a cell ID. The same PSC is used for each of the last OFDM symbols of the 1st slot and the 11th slot.

A secondary synchronization signal (SSS) includes a 1st SSS and a 2nd SSS. The 1st SSS and the 2nd SSS are transmitted in an OFDM symbol adjacent to an OFDM symbol in which the PSS is transmitted. The SSS is used to obtain frame synchronization. The SSS is used to obtain a cell ID together with the PSS. The 1st SSS and the 2nd SSS use different secondary synchronization codes (SSCs). If the 1st SSS and the 2nd SSS each include 31 subcarriers, sequences of two SSCs with a length of 31 are respectively used for the 1st SSS and the 2nd SSS.

A physical broadcast channel (PBCH) is transmitted in four preceding OFDM symbols of a 2nd slot of the 1st subframe. The PBCH carries necessary system information required by a UE to communicate with a BS. System information transmitted through the PBCH is referred to as a master information block (MIB). In comparison thereto, system information transmitted through a physical downlink control channel (PDCCH) is referred to as a system information block (SIB).

As disclosed in 3GPP TS 36.211 V8.5.0 (2008-12), the LTE classifies a physical channel into a data channel, i.e., a physical downlink shared channel (PDSCH) and a physical uplink shared channel (PUSCH), and a control channel, i.e., a physical downlink control channel (PDCCH) and a physical uplink control channel (PUCCH). Further, there is a downlink control channel, i.e., a physical control format indicator channel (PCFICH) and a physical hybrid-ARQ indicator channel (PHICH).

Figure 3:
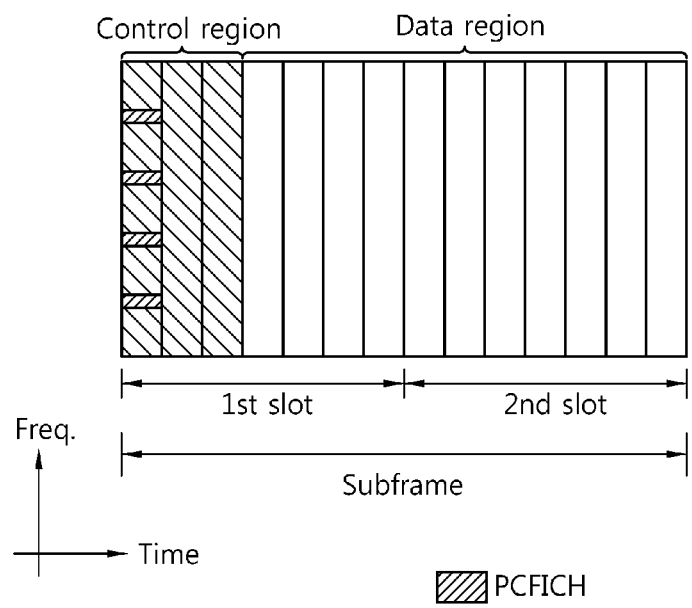
FIG. 3 is a diagram showing the structure of a downlink subframe in the 3GPP LTE.

FIG. 3 is a diagram showing the structure of a downlink subframe in the 3GPP LTE. A subframe is divided into a control region and a data region in a time domain. The control region includes up to three preceding OFDM symbols of a 1st slot in the subframe. The number of OFDM symbols included in the control region may vary. A PDCCH is allocated to the control region, and a PDSCH is allocated to the data region.

Control information transmitted through the PDCCH is referred to as downlink control information (DCI). The DCI may include resource allocation of the PDSCH (this is referred to as a downlink grant), resource allocation of a PUSCH this is referred to as an uplink grant), a set of transmit power control commands for individual UEs in any UE group and/or activation of a voice over Internet protocol (VoIP).

A PCFICH transmitted in a 1st OFDM symbol in the subframe carries information regarding the number of OFDM symbols (i.e., a size of the control region) used for transmission of control channels in the subframe.

A PHICH carries an acknowledgement (ACK)/not-acknowledgement (NACK) signal for uplink hybrid automatic repeat request (HARM). That is, the ACK/NACK signal for uplink data transmitted by the UE is transmitted over the PHICH.

Figure 4:
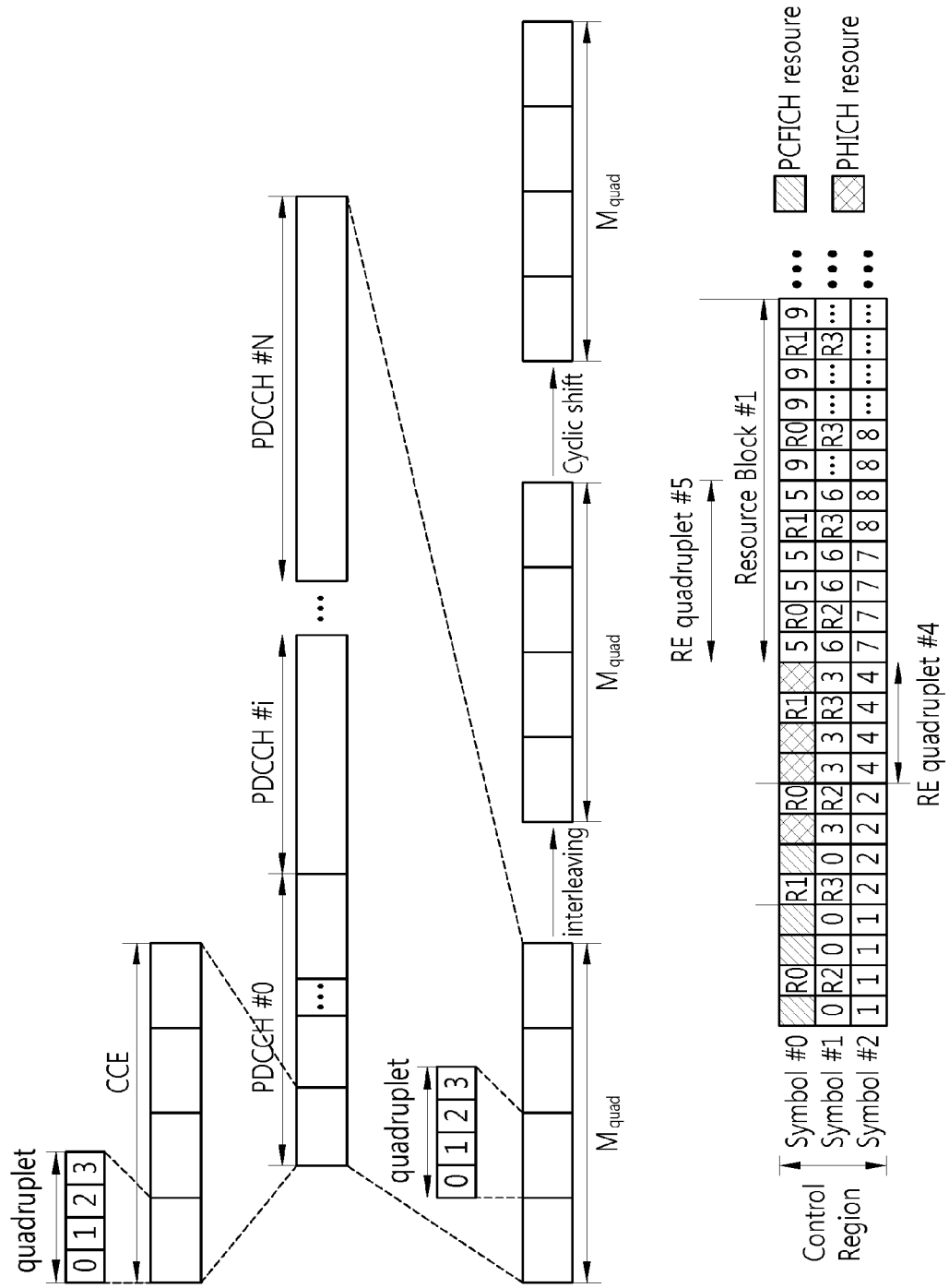
FIG. 4 is a diagram showing an example of the resource mapping of PDCCHs.

FIG. 4 is a diagram showing an example of the resource mapping of PDCCHs. The section 6 of 3GPP TS 36.211 V8.5.0 (2008-12) may be incorporated herein by reference. R0 denotes a reference signal of a 1st antenna, R1 denotes a reference signal of a 2nd antenna, R2 denotes a reference signal of a 3rd antenna, and R3 denotes a reference signal of a 4th antenna.

A control region in a subframe includes a plurality of control channel elements (CCEs). The CCE is a logical allocation unit used to provide the PDCCH with a coding rate depending on a radio channel state, and corresponds to a plurality of resource element groups (REGs). According to an association relation of the number of CCEs and the coding rate provided by the CCEs, a PDCCH format and a possible number of bits of the PDCCH are determined.

One REG (indicated by a quadruple in FIG. 4) includes 4 REs. One CCE includes 9 REGs. The number of CCEs used to configure one PDCCH may be selected from a set {1, 2, 4, 8}. Each element of the set {1, 2, 4, 8} is referred to as a CCE aggregation level.

A control channel consisting of one or more CCEs performs interleaving in an REG unit, and is mapped to a physical resource after performing cyclic shift based on a cell identifier (ID).

Figure 5:
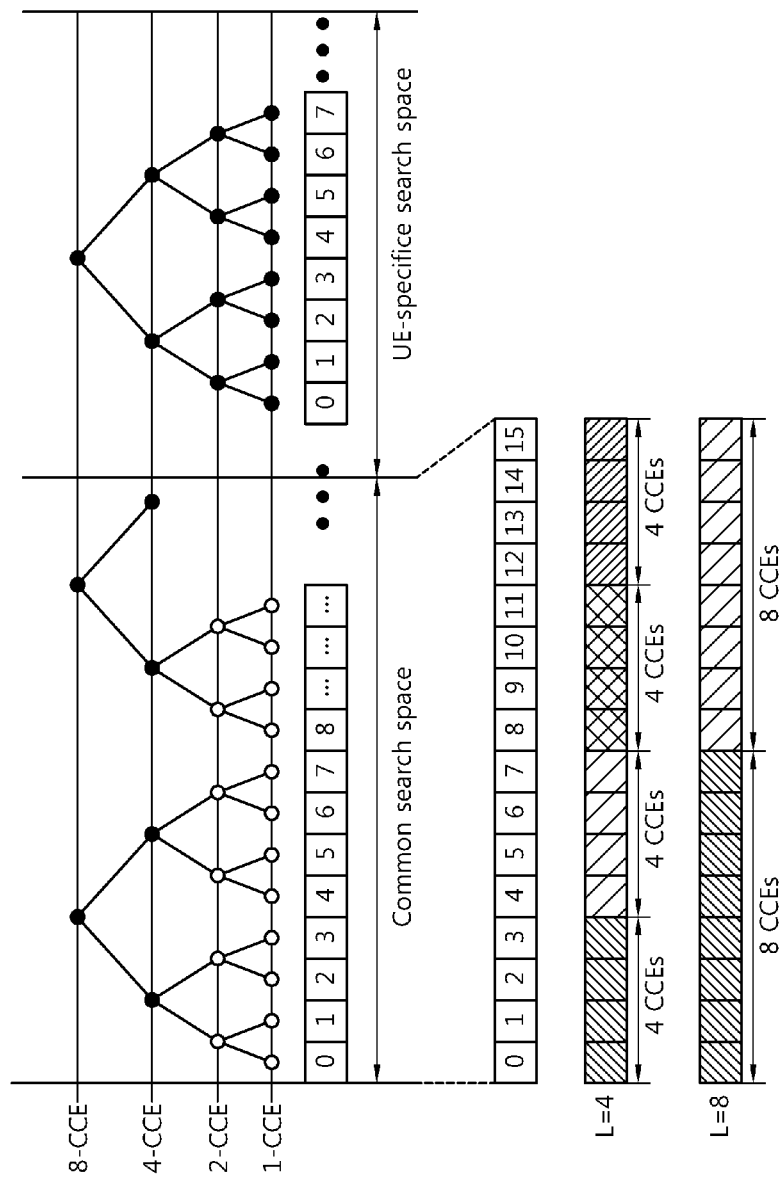
FIG. 5 is an exemplary view showing the monitoring of PDCCHs.

FIG. 5 is an exemplary view showing the monitoring of PDCCHs. For the monitoring of PDCCHs, reference can be made to section 9 of 3GPP TS 36.213 V8.5.0 (2008-12). In the 3GPP LTE, blind decoding is used to detect PDCCHs. Blind decoding is a method of demasking a specific ID for the CRC of a received PDCCH (referred to a candidate PDCCH) and checking CRC error in order to determine whether the corresponding PDCCH is its own control channel. A UE does not know that its own PDCCH is transmitted using which CCE aggregation level or which DCI format at which position within the control region.

A plurality of PDCCHs can be transmitted in one subframe. A UE monitors the plurality of PDCCHs every subframe. Monitoring is an operation of attempting PDCCH decoding by the UE according to a format of the monitored PDCCH.

The 3GPP LTE uses a search space to reduce an overload caused by blind decoding. The search space can be called a monitoring set of CCEs for PDCCHs. A UE monitors the PDCCHs within a corresponding search space.

The search space is classified into a common search space and a UE-specific search space. The common search space is a space for searching for a PDCCH having common control information and consists of 16 CCEs indexed with 0 to 15. The common search space supports a PDCCH having a CCE aggregation level of {4, 8}. The UE-specific search space supports a PDCCH having a CCE aggregation level of {1, 2, 4, 8}.

A method of transmitting an ACK/NACK signal through the PUCCH in the 3GPP LTE is described below.

FIG. 6 is a diagram showing an example of an uplink subframe in the 3GPP LTE. The uplink subframe can be divided into a control region to which a physical uplink control channel (PUCCH) carrying uplink control information is allocated and a data region to which a physical uplink shared channel (PUSCH) carrying uplink data is allocated. A PUCCH for a UE is allocated in a pair of resource blocks in a subframe. Resources blocks belonging to the resource block-pair occupy different subcarriers in a first slot and a second slot. In FIG. 6, m is a position index indicating a logical frequency region position of the resource block pair, allocated to PUCCHs within the uplink subframe. FIG. 6 shows that resource blocks having the same m value occupy different subcarriers in the two slots.

In accordance with 3GPP TS 36.211 V8.5.0 (2008-12), a PUCCH supports a multiple formats. PUCCHs having different numbers of bits per subframe can be used in accordance with a modulation scheme dependent on a PUCCH format.

The table 1 shows an example of modulation schemes and the number of bits per subframe according to PUCCH formats.

TABLE 1

| PUCCH Format | Modulation Scheme | Number of Bits per subframe |
|---|---|---|
| 1 | N/A | N/A |
| 1a | BPSK | 1 |

TABLE 1-continued

| PUCCH Format | Modulation Scheme | Number of Bits per subframe |
|---|---|---|
| 1b | QPSK | 2 |
| 2 | QPSK | 20 |
| 2a | QPSK + BPSK | 21 |
| 2b | QPSK + BPSK | 22 |

The PUCCH format 1 is used to transmit an SR (Scheduling Request), the PUCCH formats 1a/1b are used to transmit an ACK/NACK signal for an HARQ, the PUCCH format 2 is used to transmit a CQI, and each of the PUCCH formats 2a/2b is used to simultaneously transmit a CQI and an ACK/NACK signal. When only the ACK/NACK signal is transmitted in a subframe, the PUCCH formats 1a/1b are used, but when only the SR is transmitted in a subframe, the PUCCH format 1 is used. When the SR and the ACK/NACK signal are simultaneously transmitted, the PUCCH format 1 is used. The ACK/NACK signal modulated in resources to which the SR has been allocated is transmitted.

Each of all the PUCCH formats uses the cyclic shift (CS) of a sequence in each OFDM symbol. The cyclic-shifted sequence is generated by cyclically shifting a base sequence by a specific CS amount. The specific CS amount is indicated by a CS index.

An example in which the base sequence $r_u(n)$ is defined is shown as:

MathFigure 1

$$r_u(n) = e^{jb(n)\pi/4} \quad [\text{Math. 1}]$$

where u indicates a root index, n indicates an element index where $0 \le n \le N-1$, and N indicates the length of the base sequence. b(n) is defined in 3GPP TS 36.211 V8.5.0 (2008-12).

The length of the base sequence is equal to the number of elements included in the base sequence. μ can be determined based on a cell ID (identifier) or a slot number within a radio frame. Assuming that the base sequence is mapped to one resource block in the frequency domain, the length of the base sequence N is 12 because one resource block includes 12 subcarriers. A different base sequence can be defined on the basis of a different root index.

A cyclic-shifted sequence $r(n, I_{cs})$ can be generated by cyclically shifting a base sequence $r(n)$ as shown:

MathFigure 2

$$r(n, I_{CS}) = r(n)E\exp\left(\frac{j2\pi I_{CS}n}{N}\right), 0 D I_{CS} D N - 1 \quad [\text{Math. 2}]$$

where $I_{cs}$ is a CS index indicating the CS amount ($0 \le I_{cs} \le N-1$).

Hereinafter, available CS indices of the base sequence refer to CS indices that can be derived from the base sequence on the basis of a CS interval. For example, assuming that the length of the base sequence is 12 and the CS interval is 1, a total number of available CS indices of the base sequence is 12. Assuming that the length of the base sequence is 12 and the CS interval is 2, the number of available CS indices of the base sequence is 6.

A method of transmitting the HARQ ACK/NACK signal in the PUCCH formats 1/1a/1b (hereinafter collectively referred to as a PUCCH format 1) is described below.

Figure 7:
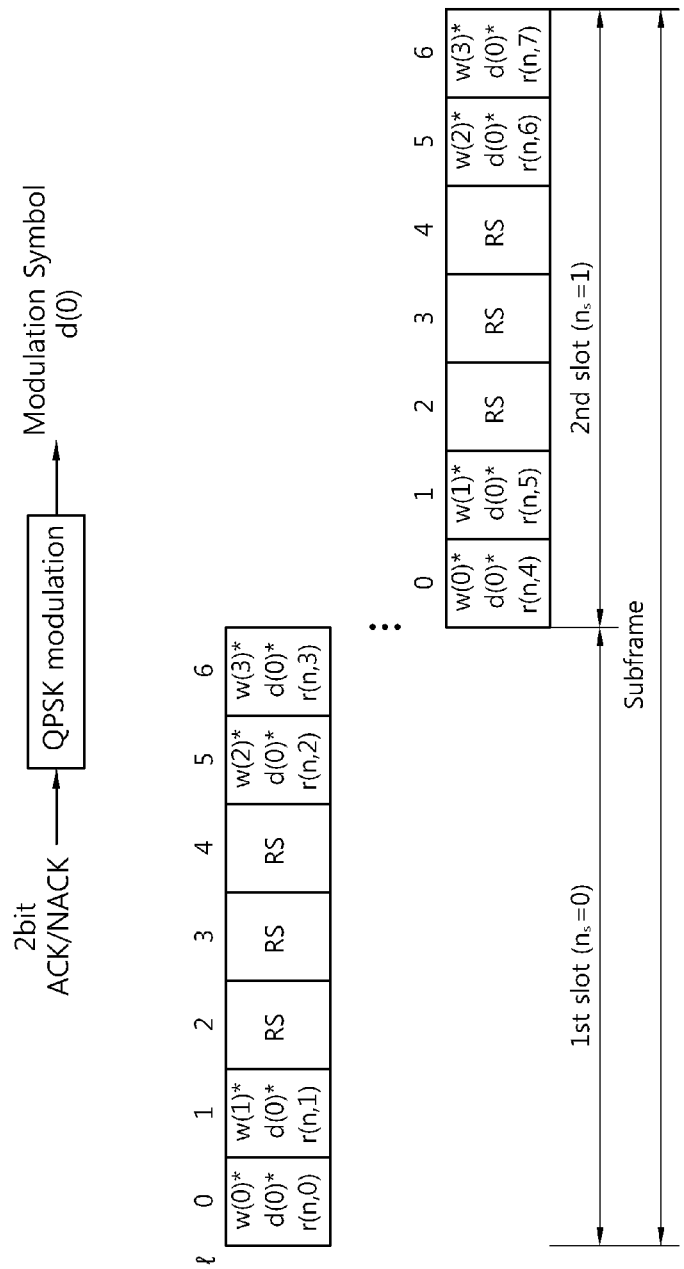
FIG. 7 is a diagram showing a PUCCH format 1 in a normal CP in the 3GPP LTE.
Figure 8:
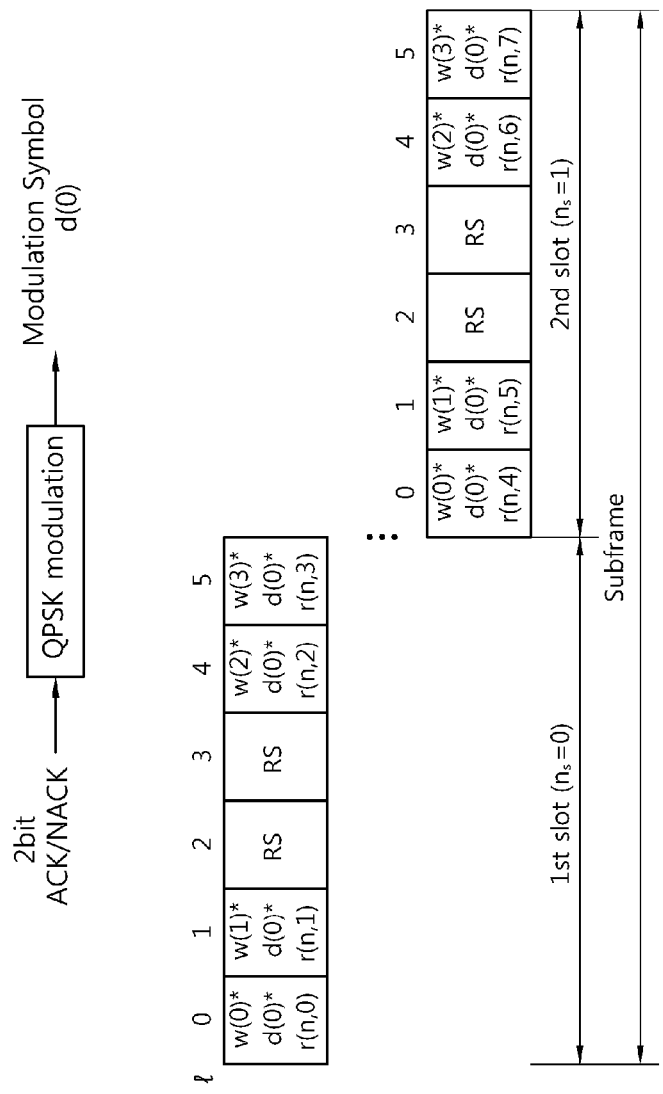
FIG. 8 is a diagram showing a PUCCH format 1 in an extended CP in the 3GPP LTE.

FIG. 7 is a diagram showing the PUCCH format 1 in a normal CP in the 3GPP LTE. FIG. 8 is a diagram showing the PUCCH format 1 in an extended CP in the 3GPP LTE. The normal CP and the extended CP have different positions and different numbers of reference signals (RSs) because they include different numbers of OFDM symbols in one slot, but have the same ACK/NACK transmission structure.

A modulation symbol d(0) is generated by modulating an 1-bit ACK/NACK signal through BPSK (Binary Phase Shift Keying) or a 2-bit ACK/NACK signal through QPSK (Quadrature Phase Shift Keying).

In the normal CP or the extended CP, one slot includes 5 OFDM symbols for transmitting the ACK/NACK signal. One subframe includes 10 OFDM symbols for transmitting the ACK/NACK signal. The modulation symbol d(0) is spread with a cyclic-shifted sequence r(n, $I_{cs}$). Assuming 1-dimensional spread sequence corresponding to an (i+1)th OFDM symbol in a subframe is m(i), {m(0), m(1), ..., m(9)}={d(0) r(n, $I_{cs}$), d(0)r(n, $IC_{cs}$), ..., d(0)r(n, $I_{cs}$)}.

To increase UE capacity, the 1-dimensional spread sequence can be spread using an orthogonal sequence.

An orthogonal sequence $w_i(k)$, where i is a sequence index and 0≤k≤K−1, having a spreading factor K=4 may use the following sequence.

TABLE 2

| Index (i) | [$w_i(0), w_i(1), w_i(2), w_i(3)$] |
|---|---|
| 0 | [+1, +1, +1, +1] |
| 1 | [+1, −1, +1, −1] |
| 2 | [+1, −1, −1, +1] |

The orthogonal sequence $w_i(k)$, where i is a sequence index and 0≤k≤K−1, having a spreading factor K=3 may use the following sequence.

TABLE 3

| Index (i) | [$w_i(0), w_i(1), w_i(2)$] |
|---|---|
| 0 | [+1, +1, +1] |
| 1 | [+1, $e^{j2\pi/3}$, $e^{j4\pi/3}$] |
| 2 | [+1, $e^{j4\pi/3}$, $e^{j2\pi/3}$] |

A different spreading factor can be used for each slot. In the 3GPP LTE, the last OFDM symbol within a subframe is used in order to transmit an SRS (sounding reference signal). Here, in a PUCCH, a first slot uses the spreading factor K=4 and a second slot uses the spreading factor K=3.

Accordingly, assuming that a certain orthogonal sequence index i is given, 2-dimensional spread sequences s(0), s(1), ..., s(9) can be expressed as follows:
{s(0), s(1), ..., s(9)}={$w_i$(0)m(0), $w_i$(1)m(1), $w_i$(2)m(2), $w_i$(3)m(3), $w_i$(4)m(4), $w_i$(0)m(5), $w_i$(1)m(7), $w_i$(2)m(8), $w_i$(3)m(9)}.

The CS index $I_{cs}$ can vary depending on a slot number (ns) within a radio frame or a symbol index (l) within a slot or both. Assuming that the first CS index is 0 and the value of a CS index is increased by 1 every OFDM symbol, {s(0), s(1), ..., s(9)}={$w_i$(0)d(0)r(n, 0), $w_i$(1)d(1)r(n, 1), $w_i$(3)d(9) r(n,9)}, as shown in FIGS. 7 and 8.

The 2-dimensional spread sequences {s(0), s(1), ..., s(9)} are subject to IFFT and then transmitted through corresponding resource blocks. Accordingly, the ACK/NACK signal is transmitted on the PUCCH.

The orthogonal sequence index i, the CS index L, and the resource block index m are parameters necessary to constitute a PUCCH and also resources used to distinguish PUCCHs (or UEs) from each other. Assuming that the number of available CSs is 12 and the number of available orthogonal sequence indices is 3, PUCCHs for a total of 36 UE can be multiplexed to one resource block.

In the 3GPP LTE, in order for a UE to acquire the above three parameters for constituting the PUCCH, a resource index $n^{(1)}_{PUCCH}$ is defined. The resource index $n^{(1)}_{PUCCH}=n_{CCE}+N^{(1)}_{PUCCH}$. Here, $n_{CCE}$ is the number of first CCEs used to transmit a corresponding DCI (i.e., the allocation of downlink resources used to receive downlink data corresponding to an ACK/NACK signal), and $n^{(1)}_{PUCCH}$ is a parameter that a BS informs the UE through an upper layer message.

Consequently, it can be said that resources used to transmit a PUCCH are implicitly determined depending on the resources of a corresponding PDCCH. This is because a UE does not separately inform a BS of resources used to transmit a PUCCH for an ACK/NACK signal, but indirectly informs the BS of resources used for a PDCCH used to transmit downlink data.

Figure 9:
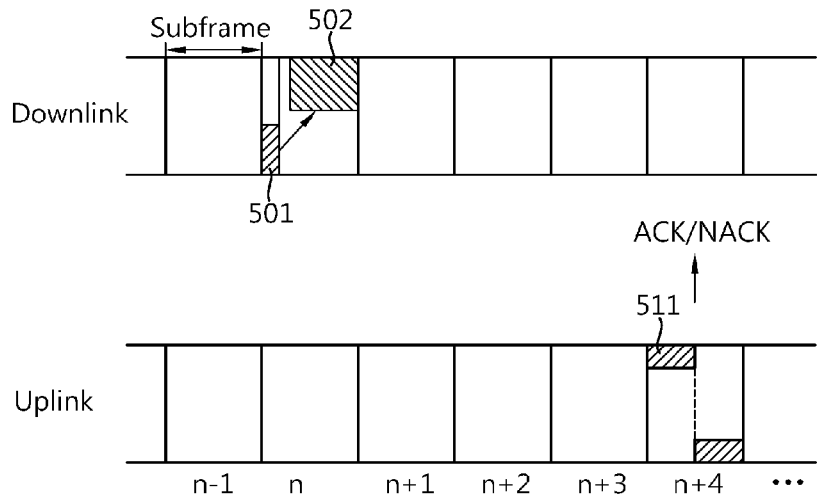
FIG. 9 is a diagram showing an example in which an HARQ is performed.

FIG. 9 is a diagram showing an example in which an HARQ is performed. A UE monitors PDCCHs and receives a PDCCH 501, including a downlink grant, in an n-th subframe. The UE receives a downlink transport block through a PDSCH 502 indicated by the downlink grant.

The UE transmits an ACK/NACK signal for the downlink transport block on the PUCCH 511 in an (n+4)th subframe. The ACK/NACK signal becomes an ACK signal if the downlink transport block is successfully decoded and a NACK signal if the downlink transport block is unsuccessfully decoded. When the NACK signal is received, a BS can retransmit the downlink transport block until the reception of an ACK signal or a maximum number of retransmissions.

To constitute the PUCCH 511, the UE uses resource allocation of the PDCCH 501. That is, the lowest CCE index used to transmit the PDCCH 501 becomes $n_{CCE}$, and a resource index, such as $n^{(1)}_{PUCCH}=n_{CCE}+N^{(1)}_{PUCCH}$, is determined.

Hereinafter, referring to section 5 of 3GPP TS 36.213 V8.5.0 (2008-12), uplink transmit power in the 3GPP LTEE is disclosed.

The setting of the UE Transmit power $P_{PUSCH}$ for the PUSCH transmission in subframe i is defined by:

MathFigure 3

$$P_{PUSCH}=\min\{P_{CMAX}, 10 \log_{10}(M_{PUSCH}(i)))+P_{O\_PUSCH}(j))+\alpha(j)PL+\Delta_{TF}(i)+f(i)\}$$ [Math. 3]

where $P_{CMAX}$ is the configured UE transmitted power, and $M_{PUSCH}(i)$ is the bandwidth of the PUSCH resource assignment expressed in number of resource blocks valid for subframe i. $P_{O\_PUSCH}(j)$ is a parameter composed of the sum of a cell specific nominal component $P_{O\_NOMINAL\_PUSCH}(j)$ provided from higher layers for j=0 and 1 and a UE specific component $P_{O\_UE\_PUSCH}(j)$ provided by higher layers for j=0 and 1. α(j) is a specific parameter provided by higher layers. PL is the downlink pathloss estimate calculated in the UE. $\Delta_{TF}(i)$ is a UE specific parameter. f(i) is a UE specific value obtained from a transmit power control (TPC) command.

The setting of the UE Transmit power $P_{PUCCH}$ for the PUCCH transmission in subframe i is defined by:

MathFigure 4

$$P_{PUCCH}=\min\{P_{CMAX}, P_{O\_PUCCH}+PL+h(n_{CQI}, n_{HARQ})+\Delta_{F\_PUCCH}(F)+g(i)\}$$ [Math. 4]

where $P_{CMAX}$ and PL are same as the equation 3, and $P_{O\_PUCCH}$ is a parameter composed of the sum of a cell specific parameter $P_{O\_NOMINAL\_PUCCH}$ provided by higher layers and a UE specific component $P_{O\_UE\_PUCCH}$ provided by higher layers. $h(n_{CQI}, n_{HARQ})$ is a PUCCH format dependent value. $\Delta_{F\_PUCCH}(F)$ is a parameter provided by higher layers. $g(i)$ is a UE specific value obtained from a transmit power control (TPC) command.

Hereinafter, multiple antenna transmission in uplink is disclosed.

Figure 10:
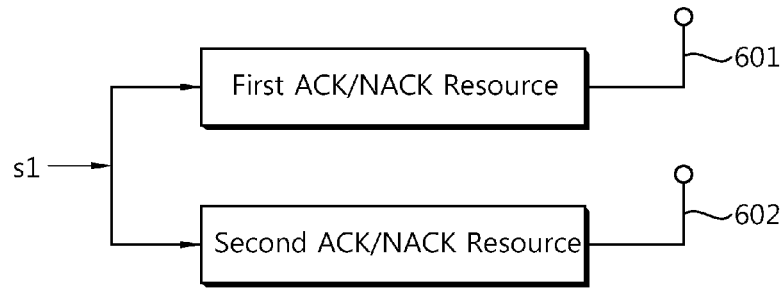
FIG. 10 is a diagram showing an example in which an ACK/NACK signal is transmitted in a multi-antenna.

FIG. 10 is a diagram showing an example in which an ACK/NACK signal is transmitted via a multi-antenna.

The time, frequency, and/or code resources used to transmit an ACK/NACK signal are referred to as ACK/NACK resources or PUCCH resources. As described above, the index of an ACK/NACK resource (also referred to as an ACK/NACK resource index or a PUCCH index) necessary to transmit the ACK/NACK signal on PUCCHs can be expressed into at least any one of the orthogonal sequence index i, the CS index $I_{cs}$, the resource block index m, and indices for finding the three indices. The ACK/NACK resource can include at least any one of an orthogonal sequence, a CS, a resource block, and a combination of them.

Although the ACK/NACK resource index is illustrated to be the above resource index $n^{(1)}_{PUCCH}$ in order to clarify the description, the configuration or expression of the ACK/NACK resource is not limited.

A modulation symbol s1 of an ACK/NACK signal is transmitted through a first antenna 601 using a first ACK/NACK resource and transmitted through a second antenna 602 using second ACK/NACK resources.

A first orthogonal sequence index $i_1$, a first CS index $I_{cs1}$, and a first resource block index $m_1$ are determined based on a first ACK/NACK resource index, and a first PUCCH is configured based on the determined indices. A second orthogonal sequence index $i_2$, a second CS index $I_{cs2}$, and a second resource block index $m_2$ are determined based on a second ACK/NACK resource index, and a second PUCCH is configured based on the determined indices. The modulation symbol s1 is transmitted through the first antenna 601 on the first PUCCH and transmitted through the second antenna 602 on the second PUCCH.

Consequently, since the same ACK/NACK signal is transmitted through different antennas using different resources, transmit diversity gain can be obtained.

In the conventional 3GPP LTE which only support single antenna transmission, a single ACK/NACK resource is determined on the basis of resources used to transmit PDCCHs. More specifically, a single resource index (i.e., an index of the ACK/NACK resources) is determined on the basis of the lowest CCE index used to transmit a PDCCH. This scheme however, two ACK/NACK resources are needed to implement the example of FIG. 10. This means that a plurality of ACK/NACK resources has to be allocated for multiple antenna transmission.

Figure 11:
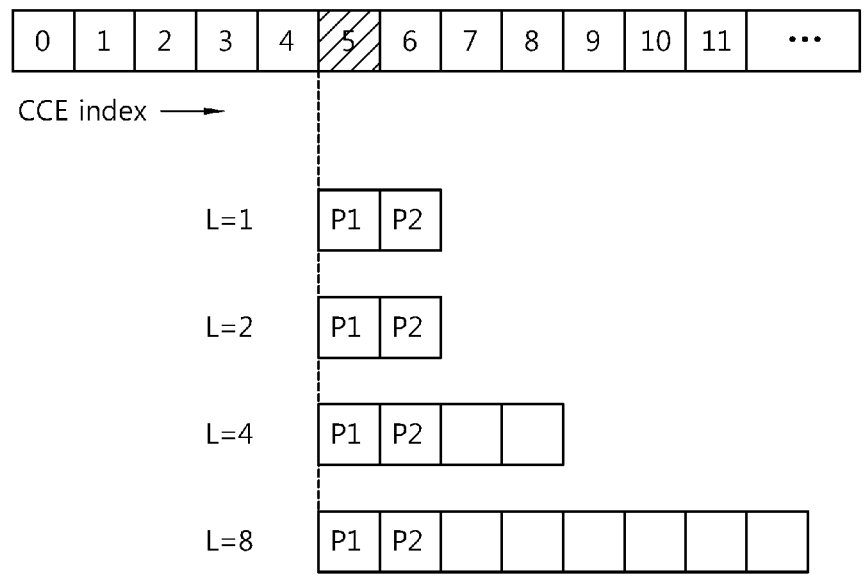
FIG. 11 is a diagram showing a method of determining a plurality of resources.

FIG. 11 is a diagram showing a method of determining a plurality of resources. In this method, a first ACK/NACK resources are determined like the conventional 3GPP LTE, but a second ACK/NACK resources are determined on the basis of a CCE index next to the lowest CCE index.

It is assumed that a CCE index 5 used to transmit a PDCCH for a downlink grant, from among CCE indices, is the lowest index. If the CCE aggregation level L is 1, a first ACK/NACK resource index P1 is determined on the basis of the lowest CCE index 5 as in the existing method, and a second ACK/NACK resource index P2 is determined on the basis of an index 6 subsequent to the lowest CCE index 5. The same principle is applied to CCE aggregation levels L=2, 4, and 8.

If the CCE index next to the lowest CCE index is larger than $N_{CCE}-1$, the CCE index next to the lowest CCE index may be set to 0 by using cyclic shift. $N_{CCE}$ is the total number of CCEs.

In other words, the first and second ACK/NACK resource indices P1 and P2 may respectively be defined as $P1=n_{CCE}+N^{(1)}_{PUCCH}$ and $P2=n_{CCE+1})+N^{(1)}_{PUCCH}$, respectively, irrespective of their CCE aggregation levels.

Although the second ACK/NACK resource index P2 is illustrated to be determined on the basis of an index subsequent to the lowest CCE index, the second ACK/NACK resource index P2 may be determined using $(n_{CCE}+b)+N^{(1)}_{PUCCH}$, more generally. Here, b is a positive or negative integer.

Now, the proposed uplink transmit power control will be described.

Even if a wireless apparatus supports multiple-antenna transmission, the multipleantenna transmission cannot always be used. Due to any reason such as non-allocation of resources, etc., the wireless apparatus has to be able to dynamically perform switching between multiple-antenna transmission and single-antenna transmission.

In the example of FIG. 11, if a CCE index 6 is allocated to another UE, a UE obtains only a first ACK/NACK resource and cannot obtain a second ACK/NACK resource. If only one ACK/NACK resource is obtained, the UE can transmit an ACK/NACK signal through one antenna by using one ACK/NACK resource. That is, multiple-antenna transmission using two antennas is switched to single-antenna transmission.

When a transmit mode is switched, link capability may deteriorate if transmit power cannot be effectively controlled.

Figure 12:
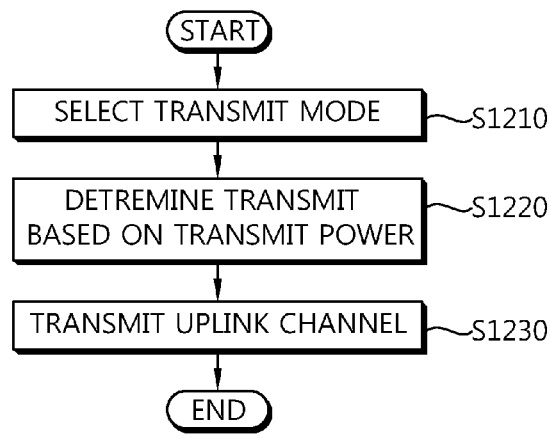
FIG. 12 is a flowchart showing a transmission power control method according to an embodiment of the present invention.

FIG. 12 is a flowchart showing a transmission power control method according to an embodiment of the present invention.

A UE selects one transmit mode among a plurality of transmit modes (step S1210). The transmit mode is an uplink transmit mode of the UE using multiple antennas or a single antenna.

Transmission using the multiple antennas is referred to as a multiple-antenna transmit mode, and transmission using the single antenna is referred to as a single-antenna transmit mode. Multiple-antenna transmission can be classified according to the number of antennas in use. For example, if up to 4 antennas are supported, the UE can dynamically switch the multiple-antenna transmit mode using two or more antennas and the single-antenna transmit mode using one antenna. The multiple-antenna transmission may use different transmit modes when the number of antennas is 2, 3, and 4.

The UE can determine the transmit mode by the instruction of a BS. The BS can instruct the multiple-antenna transmit mode or the single-antenna transmit mode to the UE by using a higher-layer message or a PDCCH.

The UE can determine the transmit mode on the basis of a resource (i.e., a PUCCH resource) allocated to uplink transmission. If the number of PUCCH resources allocated to the UE is greater than 1, the multiple-antenna transmit mode can be determined as the transmit mode, and if the number of PUCCH resources is 1, the singleantenna transmit mode can be determined as the transmit mode.

The UE determines transmit power of an uplink channel on the basis of the selected transmit mode (step S1220). The transmit power can be determined on the basis of a transmit power offset $\Delta(M)$ depending on the transmit mode. M denotes the transmit mode.

For example, it is assumed that M=1 denotes a single-antenna transmit mode, M=2 denotes a multiple-antenna transmit mode using two antennas (or two resources), M=3 denotes a multiple-antenna transmit mode using three antennas (or three resources), and M=4 denotes a multiple-antenna transmit mode using four antennas (or four resources). The UE determines one transmit power offset among $\Delta(1)$, $\Delta(2)$, $\Delta(3)$, and $\Delta(4)$ according to the selected transmit mode.

The UE determines the transmit power offset $\Delta(M)$ according to the transmit mode, and can add the determined transmit power offset to the transmit power of the uplink channel.

When the transmit mode is considered, transmit power $P_{PUSCH}$ for PUSCH transmission of Equation 3 can be modified as follows.

MathFigure 5

$$P_{PUSCH}=\min\{P_{CMAX}, 10\log_{10}(M_{PUSCH}(i))+ P_{O\_PUSCH}(j)+\alpha(j)PL+\Delta_{TF}(i)+\Delta(M)+f(i)\} \quad [\text{Math. 5}]$$

In addition, transmit power $P_{PUCCH}$ for PUCCH transmission of Equation 4 can be modified as follows.

MathFigure 6

$$P_{PUCCH}=\min\{P_{CMAX}, P_{0\_PUCCH}+PL+h(n_{CQI}, n_{HARQ})+ \Delta_{F\_PUCCH}(F)+\Delta(M)+g(i)\} \quad [\text{Math. 6}]$$

The above equation is for exemplary purposes only, and thus various modifications can be made by those ordinary skilled in the art. For example, the transmit power offset $\Delta(M)$ can be included in a UE-specific parameter (e.g., $\Delta_{TF}(i)$, f(i), $\Delta_{F\_PUCCH}(F)$, and g(i)) used to calculate the transmit power.

The UE transmits the uplink channel by using the transmit power (step S1230). When an ACK/NACK signal is transmitted using two antennas and two PUCCH resources, the ACK/NACK signal can be transmitted as shown in FIG. 10.

When the UE switches from the multiple-antenna transmit mode to the singleantenna transmit mode, if the UE performs single-antenna transmission while maintaining the same transmit power as that used in multiple-antenna transmission, link capability may deteriorate.

For example, it is assumed that two PUCCH resources are allocated to the UE, and the UE transmits an ACK/NACK signal through two antennas in the multiple-antenna transmit mode. It is also assumed that transmit power of each transmit antenna is X dBm. In this case, total transmit power is X+3 dBm.

When one PUCCH resource is allocated to the UE for a certain reason, the UE can be switched to the single-antenna mode. In this case, if the transmit power maintains the previous transmit power X dBm, link capability may deteriorate. The previous transmit power X dBm is designed by considering a transmit diversity gain. This is because the transmit diversity gain decreases in the single-antenna transmission.

Therefore, the proposed method allows the UE to control the transmit power of the uplink channel according to the transmit mode.

The less the number of antennas in use, the greater the transmit power offset $\Delta(M)$ can be set. For example, $\Delta(2)$ can be set to 0, and $\Delta(1)$ can be set to K (where K is a positive integer).

The transmit power offset $\Delta(M)$ can be pre-defined.

The BS can send information for obtaining the transmit power offset $\Delta(M)$ to the UE. The BS can send a transmit power offset depending on each transmit mode, or send a difference between a transmit power offset of one transmit mode and a transmit power offset of the remaining transmit modes. The information can be transmitted by using system information, an RRC message, a MAC message, or a PDCCH.

The transmit power offset $\Delta(M)$ can vary depending on a PUCCH format. This is because a compensation value of the transmit power may differ since the transmit diversity gain varies depending on the PUCCH format.

Figure 13:
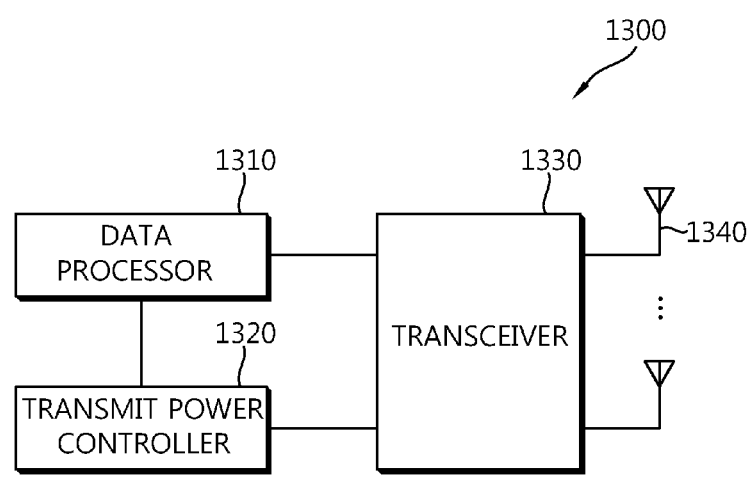
FIG. 13 is a block diagram showing a wireless apparatus for implementing an embodiment of the present invention.

FIG. 13 is a block diagram showing a wireless apparatus for implementing an embodiment of the present invention. The wireless apparatus may be a part of a UE and implements the embodiment of FIG. 12.

A wireless apparatus 1300 includes a data processor 1310, a transmit power controller 1320, a transceiver 1330, and a plurality of antennas 1340.

The data processor 1310 implements encoding/decoding and modulation/demodulation of traffic data and/or control signals (e.g., CQI and ACK/NACK).

The transmit power controller 1320 controls transmit power of an uplink channel. As shown in the embodiment of FIG. 12, the transmit power controller 1320 can determine a transmit mode, and can determine the transmit power of the uplink channel on the basis of the transmit mode.

The transceiver 1330 transmits the traffic data and/or the control signals through one or more antennas 1340 on the uplink channel by using the transmit power.

The data processor 1310, the transmit power controller 1320, and the transceiver 1330 can be implemented by one processor, chipset, or logical circuit.

The antenna is also referred to as an antenna port, and may be a physical antenna or a logical antenna. One logical antenna may include one or more physical antennas.

In view of the exemplary systems described herein, methodologies that may be implemented in accordance with the disclosed subject matter have been described with reference to several flow diagrams. While for purposed of simplicity, the methodologies are shown and described as a series of steps or blocks, it is to be understood and appreciated that the claimed subject matter is not limited by the order of the steps or blocks, as some steps may occur in different orders or concurrently with other steps from what is depicted and described herein. Moreover, one skilled in the art would understand that the steps illustrated in the flow diagram are not exclusive and other steps may be included or one or more of the steps in the example flow diagram may be deleted without affecting the scope and spirit of the present disclosure.

The invention claimed is:

1. A method for transmitting a control signal in a wireless communication system, the method comprising:

determining, by a user equipment (UE), a first physical uplink control channel (PUCCH) resource for a first antenna port and a second PUCCH resource for a second antenna port; and transmitting, by the UE, a PUCCH via the first antenna port and the second antenna port by using the first PUCCH resource and the second PUCCH resource based on an uplink transmit power, wherein the uplink transmit power $P_{PUCCH}(i)$ at subframe i is determined by:

$$P_{PUCCH}(i)=\min\{P_{CMAX(i)}, P_{0\_PUCCH}PL+h(n_{CQI}, n_{HARQ})+\Delta_{F\_PUCCH}(F)+\Delta(M)+g(i)\}$$

where $P_{CMAX(i)}$ is a configured UE transmit power in subframe i, $P_{0\_PUCCH}$ is a parameter composed based on provisions by a higher layer, $\Delta_{F\_PUCCH}(F)$ is a parameter provided by the higher layer, $h(n_{CQI}, n_{HARQ})$ is a PUCCH format dependent value, PL is a downlink pathloss estimate calculated in the UE, g(i) is a value related to a UE specific value, and $\Delta(M)$ is an offset value when the PUCCH is transmitted via the first antenna port and the second antenna port.

2. The method of claim 1, wherein $\Delta(M)=0$ when the PUCCH is transmitted via one antenna port.

3. The method of claim 1, wherein a list of values of $\Delta(M)$ is provided by a base station in accordance with PUCCH formats.

4. The method of claim 3, wherein the PUCCH formats are defined by:

| PUCCH Format | Modulation Scheme | Number of Bits per subframe |
|---|---|---|
| 1 | N/A | N/A |
| 1a | BPSK | 1 |
| 1b | QPSK | 2 |
| 2 | QPSK | 20 |
| 2a | QPSK + BPSK | 21 |
| 2b | QPSK + BPSK | 22 |

5. The method of claim 1, wherein the PUCCH carries at least one of a scheduling request, an ACK/NACK for hybrid automatic repeat request (HARQ) and a channel quality indicator (CQI).

6. The method of claim 1, further comprising:
receiving information about a transmission mode from a base station, the transmission mode indicating that the PUCCH is transmitted via one antenna port or two antenna ports.

7. A user equipment (UE) in a wireless communication system, the UE comprising:
a first antenna port;
a second antenna port;
a transceiver configured to:
determine a first physical uplink control channel (PUCCH) resource for a first antenna port and a second PUCCH resource for a second antenna port, and transmit a PUCCH via the first antenna port and the second antenna port by using the first PUCCH resource and the second PUCCH resource based on an uplink transmit power; and
a transmit power controller configured to determine the uplink transmit power $P_{PUCCH}(i)$ at subframe i by:

$$P_{PUCCH}(i)=\min\{P_{CMAX(i)}, P_{0\_PUCCH}+PL+h(n_{CQI}, n_{HARQ})+\Delta_{F\_PUCCH}(F)+\Delta(M)+g(i)\}$$

where $P_{CMAX(i)}$ is a configured UE transmit power in subframe i, $P_{0\_PUCCH}$ is a parameter composed based on provisions by a higher layer, $\Delta_{F\_PUCCH}(F)$ is a parameter provided by the higher layer, $h(n_{CQI}, n_{HARQ})$ is a PUCCH format dependent value, PL is a downlink pathloss estimate calculated in the UE, g(i) is a value related to a UE specific value, and $\Delta(M)$ is an offset value when the PUCCH is transmitted via the first antenna port and the second antenna port.

8. The UE of claim 7, wherein $\Delta(M)=0$ when the uplink control channel is transmitted via one antenna port.

9. The UE of claim 7, wherein a list of values of $\Delta(M)$ is provided by a base station in accordance with PUCCH formats.

10. The UE of claim 9, wherein the PUCCH formats are defined by:

| PUCCH Format | Modulation Scheme | Number of Bits per subframe |
|---|---|---|
| 1 | N/A | N/A |
| 1a | BPSK | 1 |
| 1b | QPSK | 2 |
| 2 | QPSK | 20 |
| 2a | QPSK + BPSK | 21 |
| 2b | QPSK + BPSK | 22 |

11. The UE of claim 7, wherein the PUCCH carries at least one of a scheduling request, an ACK/NACK for hybrid automatic repeat request (HARQ) and a channel quality indicator (CQI).

12. The UE of claim 7, wherein the transceiver is configured to receive information about a transmission mode from a base station, the transmission mode indicating that the uplink control channel is transmitted via one antenna port or two antenna ports.

* * * * *